(12) United States Patent
Carlson et al.

(10) Patent No.: US 12,531,185 B2
(45) Date of Patent: Jan. 20, 2026

(54) CIRCUIT BREAKER DEVICE WITH PRIMARY WINDING TURNS IN OPPOSING DIRECTIONS

(71) Applicant: Rockwell Automation Technologies, Inc., Mayfield Heights, OH (US)

(72) Inventors: Andrew E. Carlson, Franklin, WI (US); Randall S. Langer, Oak Creek, WI (US)

(73) Assignee: Rockwell Automation Technologies, Inc., Mayfield Heights, OH (US)

(*) Notice: Subject to any disclaimer, the term of this patent is extended or adjusted under 35 U.S.C. 154(b) by 382 days.

(21) Appl. No.: 18/184,824

(22) Filed: Mar. 16, 2023

(65) Prior Publication Data

US 2024/0312702 A1    Sep. 19, 2024

(51) Int. Cl.
*H01F 30/12* (2006.01)
*H01F 27/42* (2006.01)
*H01F 38/30* (2006.01)

(52) U.S. Cl.
CPC .......... *H01F 27/427* (2013.01); *H01F 30/12* (2013.01); *H01F 38/30* (2013.01)

(58) Field of Classification Search
CPC ...... H01F 27/2804; H01F 27/24; H01F 27/38; H01F 27/34; H01F 27/28; H01F 27/2823; H01F 27/289; H01F 27/306; H01F 27/346; H01F 27/33; H01F 27/42; H01F 27/2885; H02M 3/33592
See application file for complete search history.

(56) References Cited

U.S. PATENT DOCUMENTS

| | | | |
|---|---|---|---|
| 2003/0058596 A1* | 3/2003 | MacBeth | H02H 1/0015 361/42 |
| 2014/0185171 A1* | 7/2014 | Feng | H02H 3/353 361/85 |

* cited by examiner

*Primary Examiner* — Bryan R Perez

(57) ABSTRACT

The present technology relates to circuit breaker devices having current sense transformers. The current sense transformer includes a core, a secondary winding, and a primary winding coupled to the power input. The secondary winding includes a first wire wrapped around the core a number of secondary winding turns. The primary winding includes a second wire wrapped around the core a number of primary winding turns. The number of primary winding turns includes a first number of primary winding turns in a first direction and a second number of primary winding turns in an opposite direction that magnetically cancel out the second number of primary winding turns in the first direction to generate an effective number of primary winding turns. The effective number of primary winding turns and the number of secondary winding turns make up a desired turns ratio.

20 Claims, 3 Drawing Sheets

CIRCUIT BREAKER DEVICE WITH PRIMARY WINDING TURNS IN OPPOSING DIRECTIONS

TECHNICAL FIELD

Various embodiments of the present technology relate to protection devices in industrial automation environments and particularly to circuit breaker devices including current sense transformers.

BACKGROUND

Industrial automation environments, such as factories, mills, and the like, employ various devices, drives, machinery, and other components to perform industrial processes. Such industrial systems and components operate using power from a power transmission line. The power transmission line feeds three-phase alternating current (AC) power to devices. However, if the devices receive too much current or current with one or more out-of-sync phases, the devices can be damaged. In addition to the individual device damage, other damage may result including, for example the industrial automation environment may require downtime while the device is repaired or replaced.

To protect devices from harm caused by power line transmissions, industrial automation environments implement circuit protectors, surge protectors, disconnect switches, fuses, and other monitoring devices between the devices and the power line. Circuit protectors, or circuit breakers, often include sensing circuitry to detect and measure the current incoming from a power source. When sensing circuity detects large amounts of current beyond a load's threshold, the sensing circuitry can prevent the current from passing to the load. However, if internal impedance of the sensing circuitry is too low, large amounts of current may still pass through the device in the event of a short circuit event (i.e., short circuit let-though energy). Further, certain measures to increase the impedance such as increasing the gauge (i.e., decreasing the diameter) of conductive wires, may cause thermal issues, and the sensing circuitry may overheat. Various standards exist to ensure the short circuit let-though energy is sufficiently low and thermal values are sufficiently low.

SUMMARY

A circuit breaker device having a current sense transformer with primary winding turns in opposing directions is provided herein. Current sense transformers can be included in circuit breakers to detect and measure current from a power source. When the current from the power source exceeds a threshold amount, the current sense transformer can trip the circuit breaker (i.e., create an open circuit) to prevent the current from flowing through the circuit breaker to the load. A current sense transformer includes a magnetic core, primary windings, and secondary windings. The primary windings are coupled to a power source. The current flowing through the primary winding around the core creates a magnetic field. This magnetic field is transferred across the magnetic core to the secondary windings, which convert the magnetic energy back into electrical energy so that the current flowing through the secondary winding may be measured. The number of primary winding turns, or turns of a wire around a first portion of the magnetic core, relative to the number of secondary winding turns, or turns of a wire around a second portion of the magnetic core is referred to as a turns ratio. The turns ratio determines the conversion ratio of the energy from the primary winding to the secondary winding. Because the current through the primary winding is too dangerously high to measure, the current produced in the secondary winding is lower, and proportionate to the current flowing in the primary winding based on the turns ratio. The desired turns ratio is based on the design, and when the turns ratio is incorrect or not as desired, the current sense transformer may function unexpectedly or not as intended. The current through the secondary winding is measured and used to trip the circuit breaker when the measured values exceed thresholds.

In an embodiment of the present technology, a circuit breaker device is provided that includes a power input and a current sense transformer. The current sense transformer includes a core, a secondary winding, and a primary winding coupled to the power input. The secondary winding includes a first wire wrapped around the core a number of secondary winding turns. The primary winding includes a second wire wrapped around the core a number of primary winding turns. The number of primary winding turns includes a first number of primary winding turns in a first direction and a second number of primary winding turns in an opposite direction that magnetically cancel out the second number of primary winding turns in the first direction to generate an effective number of primary winding turns. The effective number of primary winding turns, and the number of secondary winding turns make up a desired turns ratio.

This Overview is provided to introduce a selection of concepts in a simplified form that are further described below in the Detailed Description. This Overview is not intended to identify key features or essential features of the claimed subject matter, nor is it intended to be used as an aid in determining the scope of the claimed subject matter.

While multiple embodiments are disclosed, still other embodiments of the present technology will become apparent to those skilled in the art from the following detailed description, which shows and describes illustrative embodiments of the invention. As will be realized, the technology is capable of modifications in various aspects, all without departing from the scope of the present invention. Accordingly, the drawings and detailed description are to be regarded as illustrative in nature and not restrictive.

BRIEF DESCRIPTION OF THE DRAWINGS

Many aspects of the disclosure can be better understood with reference to the following drawings.

Figure 1:
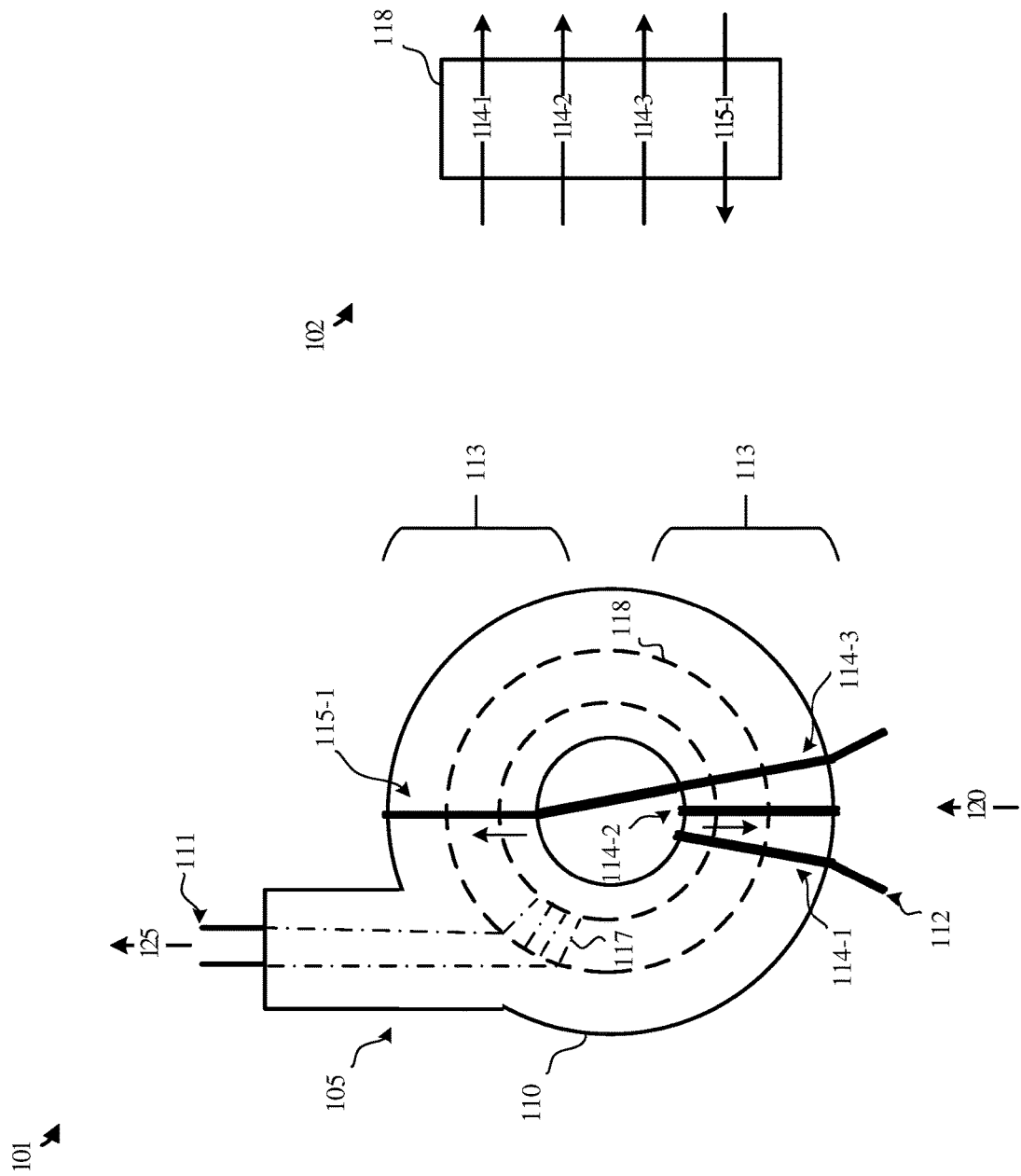
FIG. 1 illustrates example aspects of a current sense transformer in accordance with some embodiments of the present technology.

The drawings have not necessarily been drawn to scale. Similarly, some components or operations may not be separated into different blocks or combined into a single block for the purposes of discussion of some of the embodiments of the present technology. Moreover, while the technology is amendable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims. In the drawings, like reference numerals designate corresponding parts throughout the several views.

DETAILED DESCRIPTION

Various embodiments of the present technology relate to circuit breakers for load protection in industrial automation environments. A circuit breaker device having a current sense transformer with primary winding turns in opposing directions, with respect to each other, is provided herein. In industrial automation environments, circuit breaker devices are used to protect loads (e.g., motors, non-motor devices) from short-circuits and current overloads from a power source. Short-circuit and current overload protection refers to protection against excessive current, or current beyond acceptable limits of a load. To do so, circuit breaker devices can include current sense transformers.

Often, the design of a current sense transformer requires a wire having a certain length and gauge for use in the transformer windings to meet impedance goals. Such impedance goals aim to reduce overheating of the circuit breaker device while also preventing excess current from passing through the circuit breaker device to a load coupled to the circuit breaker device (i.e., short circuit let-though energy), which may cause harm to the load. Problematically, however, the length and gauge of the wire used for the transformer windings, after tuning for desired impedance and limiting let-though energy, may lead to excess length of the primary winding wire than needed to generate the desired turns ratio. The excess wire may cause voltage isolation issues if routed in other areas of the circuit breaker. Further, if too many primary winding turns are used, the core of the transformer may saturate and lead to inaccuracies. If too few primary winding turns are used, the core may not be fully utilized or optimized.

To address excess length, the wire for the primary windings can be wrapped around the core a first number of turns in a first direction and a second number of turns in a second direction opposite the first direction. In effect, the opposing turns magnetically cancel each other out. More specifically, the second number of turns in the second direction magnetically cancel out that number of turns in the first direction. For example, if the primary winding includes 15 turns in the first direction and 5 turns in the second direction, then the primary winding effectively includes 10 turns in the first direction. This not only results in the desired number of primary winding turns (i.e., the first number of turns less the second number of turns), but the excess wire does not cause other issues (e.g., voltage isolation issues) and the current sense transformer meets the original thermal and short circuit let-though energy standards.

In an embodiment, a circuit breaker device that includes a power input and a current sense transformer is provided. The current sense transformer includes a core, a secondary winding, and a primary winding coupled to the power input. The secondary winding includes a first wire wrapped around the core a number of secondary winding turns. The primary winding includes a second wire wrapped around the core a number of primary winding turns. The number of primary winding turns includes a first number of primary winding turns in a first direction and a second number of primary winding turns in an opposite direction that magnetically cancel out the second number of primary winding turns in the first direction to generate an effective number of primary winding turns. The effective number of primary winding turns, and the number of secondary winding turns make up a desired turns ratio.

In another embodiment, a system including a power source, a circuit breaker device, and a load coupled to an output of the circuit breaker device is provided. The circuit breaker device of the system includes a power input coupled to the power source, a current sense transformer, and an output. The current sense transformer includes a core, a secondary winding having a first wire wrapped around the core a number of secondary winding turns, and a primary winding coupled to the power input. The primary winding includes a second wire wrapped around the core a number of primary winding turns. The primary winding turns includes a first number of primary winding turns in a first direction and a second number of primary winding turns in an opposite direction that magnetically cancel out the second number of primary winding turns in the first direction to generate an effective number of primary winding turns. The effective number of primary winding turns and the number of secondary winding turns comprise a desired turns ratio.

In yet another embodiment, a method of configuring a circuit breaker device is included. The method includes determining a desired turns ratio for a current sense transformer, setting a number of secondary winding turns for a secondary winding of the current sense transformer, calculating a length and a gauge of a wire for a primary winding of the current sense transformer, and wrapping the wire for the primary winding of the current sense transformer around a core of the current sense transformer a first number of primary winding turns in a first direction and a second number of primary winding turns in an opposite direction that magnetically cancel out the second number of primary winding turns in the first direction to generate an effective number of primary winding turns. The effective number of primary winding turns and the number of secondary winding turns make up the desired turns ratio for the circuit breaker device.

Advantageously, a circuit breaker device, such as one disclosed herein, can eliminate thermal dissipation, impedance, and space constraint issues that may occur when a length and gauge of a wire used in a current sense transformer exceeds an amount necessary to create a desired turns ratio in the current sense transformer. This allows a circuit breaker device to be designed using any length and gauge of wire capable of meeting impedance and thermal density requirements without impacting space constraints of the circuit breaker device, because the current sense transformer can utilize primary winding turns in opposing directions to meet a desired turns ratio while conserving space in the device on the whole.

Turning now to the Figures, FIG. 1 illustrates example aspects of current sense transformer 105 in accordance with some embodiments of the present technology. Aspect 101 shows current sense transformer 105, input 120, and output 125. Current sense transformer 105 includes housing 110, magnetic core 118, wires 111 and 112, primary winding 113, and secondary winding 117. Aspect 102 illustrates a cutaway view illustrating the primary windings and magnetic field directions around core 118 internal to housing 110.

Current sense transformer 105 of aspect 101 is representative of a current measurement device that may be included in a protection device, such as a circuit breaker, that can be used in industrial automation environments, among other environments, to protect loads coupled to the circuit breaker against short-circuiting and current overloads.

Housing 110 includes a magnetic core 118, which is shown as a dotted line to visually indicate the magnetic core 118 is within housing 110. Magnetic core 118 may be capable of carrying magnetic flux. Magnetic core 118 may be made of a nanocrystalline material, silicon steel, or other ferromagnetic metals or compounds may be used. Housing 110 may comprise an epoxy coating covering magnetic core 118 and secondary winding 117, in some embodiments. Housing 110 and magnetic core 118 inside housing 110 can both be of a circular, oblong, rectangular, or any other shape having an air gap in a middle portion of magnetic core 118 and housing 110.

Input 120 may be representative of an alternating current (AC) power input coupled to an AC power supply, such as a power grid. Input 120 may include three-phase AC power. For example, in a traditional grid, the power source may produce three AC signals, each with voltage and current being 120 degrees out of phase from one another. Input 120 feeds the AC power to the circuit breaker and is coupled to current sense transformer 105, which measures and analyzes the AC signals before providing power from the power source to a load.

Wire 112 is coupled to an input 120, such that it receives the current from the power source. Wire 111 is coupled at output 125 to a measuring circuitry that measures the current output from current sense transformer 105. Wire 111 and wire 112 may be any length and gauge wire and made from any suitable conductive material such as copper or aluminum.

Primary winding 113 is created by winding wire 112 around magnetic core 118 a number of primary winding turns. The primary winding turns include a first number of primary winding turns 114-1, 114-2, and 114-3 in a first direction and a second number of primary winding turns 115-1 in a second direction. The effective number of primary winding turns is equal to the first number of primary winding turns minus the second number of primary winding turns because the second primary winding turns in the opposite direction of the first primary winding turns magnetically cancel out that number of primary winding turns in the first direction.

Secondary winding 117, which is shown as a dotted line to visually indicate the secondary winding 117 is covered by or internal to housing 110, is created by winding wire 111 around magnetic core 118 a number of secondary winding turns. The number of secondary winding turns relative to the effective number of primary winding turns is the turns ratio. The turns ratio determines the proportional step-down of current from the primary winding to that generated in the secondary winding.

In aspect 101, wire 112 used for primary winding 113 wraps around magnetic core 118 three times in a first direction, which creates primary winding turns 114-1, 114-2, and 114-3 (collective referred to as primary winding turns 114). Additionally, wire 112 wraps around magnetic core 118 one time in a second direction opposite the first direction, which creates primary winding turn 115-1. In effect, primary winding turn 115-1 magnetically cancels out one of primary winding turns 114. This occurs because primary winding turn 115-1 is in the opposite direction of primary turns 114-1, 114-2, and 114-3, and thus, the magnetic flux created by primary winding turns 114 and 115-1 opposes each other (at least in part). Thus, in aspect 101, the effective number of turns of primary winding 113 is two (i.e., three of primary winding turns 114 less one of primary winding turn 115-1).

As previously discussed, the thermal and impedance considerations may dictate the length of wire 112. For example, to ensure the circuit breaker meets standards for short-circuit let-though energy, the impedance of the primary winding 113 must be sufficiently high. However, to increase the impedance of the wire 112, either the length of the wire 112 is increased or the gauge of the wire 112 is increased (i.e., the diameter of the wire 112 is decreased). Increasing the gauge of the wire 112 may cause thermal issues that do not meet standards. Accordingly, increasing the length of wire 112 can ensure thermal and short circuit let-through energy standards are met. However, the excess length of the wire 112 must go somewhere, and routing through the circuit breaker in other places may lead to voltage isolation issues. Accordingly, additional primary windings in opposing directions to cancel each other out can ensure the circuit breaker meets all standards without creating voltage isolation issues and without disrupting the turns ratio.

In operation, wire 112 of primary winding 113 can be coupled with input 120 coupled to a power source, and wire 111 of secondary winding 117 can be coupled with a measuring and tripping circuit. When wire 112 is coupled with input 120 coupled to a power source, the power source provides energy to primary winding 113, which can convert the electrical energy from the power source into magnetic energy (magnetic flux). The magnetic energy flows through magnetic core 118 to secondary winding 117. Secondary winding 117 converts the magnetic energy back into electrical energy, with a stepped-down current based on the turns ratio of the primary winding and secondary winding. The stepped-down current can be provided to the measuring and tripping circuit coupled to output 125. The turns ratio of the current sense transformer 105 is the number of primary winding turns of primary winding 113 against the number of secondary winding turns of secondary winding 117. By way of example, if primary winding 113 has two turns, as in aspect 101, and secondary winding 117 has two turns, the turns ratio is 1:1. Accordingly, to step down the current, the secondary winding 117 often has many more turns than the primary winding 113.

Aspect 102 illustrates a cut-away view of magnetic core 118 to illustrate the magnetic field directions of primary winding turns 114 and 115-1 of primary winding 113. Primary winding 113 is made up of three primary winding turns 114-1, 114-2, 114-3 that are wound around magnetic core 118 in a first direction and one primary winding turn 115-1 that is wound around magnetic core 118 in the opposite direction. By way of example, as illustrated in aspect 102, primary winding turns 114-1, 114-2, and 114-3 may be wrapped around magnetic core 118 facing a direction to the right. Meanwhile, primary winding turn 115-1 may be wrapped around magnetic core 118 facing a direction to the left, or 180 degrees opposite relative to the direction to the right. Accordingly, the number of primary winding turns to the left (one) can cancel out the same amount of turns (one) as the number of primary winding turns to the right (three). This leaves an effective primary winding turn of three minus one (i.e., two). In other words, the primary winding turn 115-1 magnetically cancels out one primary winding turn 114-1 in the opposite direction, effectively leaving the magnetic field of two primary winding turns 114-2 and 114-3 for calculating the turns ratio.

It may be appreciated that the number of primary winding turns, in either direction, and the number of secondary winding turns may differ. Thus, any combination or variation of primary winding turns and secondary winding turns can be used to create a desired turns ratio for a current sense transformer 105.

Figure 2:
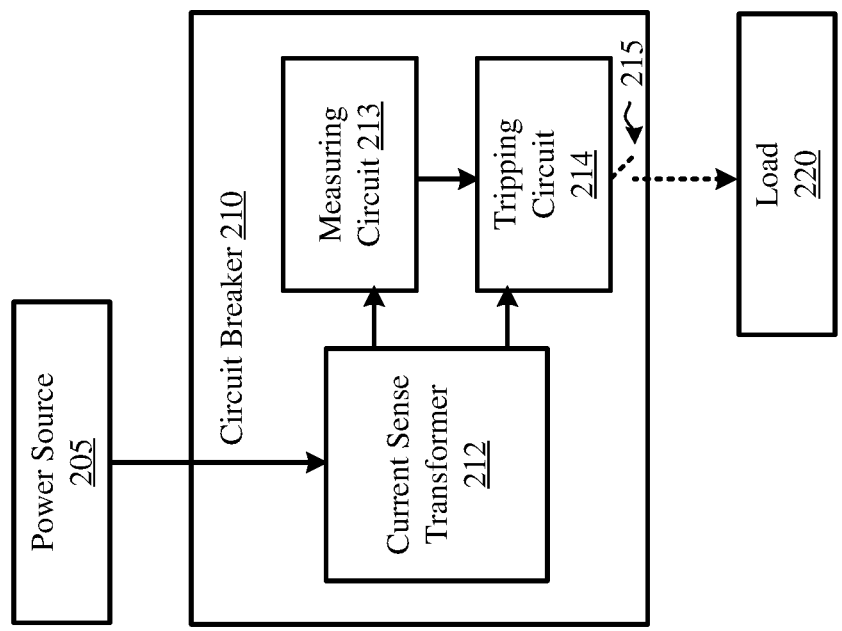
FIG. 2 illustrates an example operating environment for using a circuit breaker device in accordance with some embodiments of the present technology.

FIG. 2 illustrates an example operating environment 200 for using a circuit breaker device in accordance with some embodiments of the present technology. Operating environment 200 includes power source 205, circuit breaker 210, and load 220. Circuit breaker 210 further includes current sense transformer 212 and tripping circuit 214.

Power source 205 is representative of an AC power supply, such as a power grid. Power source 205 may produce three-phase AC power. For example, in a traditional grid, power source 205 may produce three AC signals, each with voltage and current being 120 degrees out of phase from one another. Power source 205 feeds the AC power to circuit breaker 210, which measures and analyzes the AC signals before providing power from power source 205 to load 220.

Circuit breaker 210 is representative of a protection device that can be used in industrial automation environments, among other environments, to protect load 220 coupled to circuit breaker 210 against short-circuiting and current overloads from power source 205. Circuit breaker 210 includes an input coupled to power source 205 and an output coupled to load 220. Circuit breaker 210 further includes current sense transformer 212 configured to measure electrical values provided by power source 205, and tripping circuit 214 configured to allow or prevent current from flowing through circuit breaker 210 to load 220 based on the measured electrical values.

Current sense transformer 212 may be current sense transformer 105 as described with respect to FIG. 1. Current sense transformer 212 includes an input that couple power source 205 to the primary winding (not shown, e.g., primary winding 113 as described with respect to FIG. 1) input. Current sense transformer 212 also includes a first output that couples measuring circuit 213 to the secondary winding (not shown, e.g., secondary winding 117 as described with respect to FIG. 1) and a second output that couples tripping circuit 214 to the primary winding output.

As described in detail with respect to current sense transformer 105 of FIG. 1, the primary and secondary windings of current sense transformer 212 may be formed using a copper, aluminum, or another type of conductive wiring. To create the primary and secondary windings, wires can be coiled or wrapped around portions of the core any number of times. More specifically, the secondary winding may include a first wire wrapped around the core a number of secondary winding turns. Similarly, the primary winding may include a second wire wrapped around the core a number of primary winding turns. In various embodiments, the second wire of the primary winding is wrapped around the core a number of primary winding turns in a first direction and a different number of primary winding turns in a second direction opposite the first direction. In this way, the primary winding turns in the second direction magnetically cancel out that number of primary winding turns in the first direction. This means that the effective number of primary winding turns is the difference between the number of primary winding turns in the two directions.

Measuring circuit 213 may be any circuitry used to measure the current flowing through the secondary winding of current sense transformer 212. Measuring circuit 213 may include circuitry that detects an overload that is a result of excess current over time. For example, a current flow of 20 amps may be desired, but measuring circuit 213 may measure 24 amps. While this may not be sufficient to immediately break the circuit, over time, the increased amperage may exceed a threshold and result in an overload event that causes measuring circuit 213 to use tripping circuit 214 to break the circuit. Measuring circuit 213 may include circuitry that detects an overload that is a result of a current spike. For example, a current flow of 20 amps may be desired, but measuring circuit 213 may measure 40 amps, which may exceed a threshold and result in an overload or short circuit event that causes measuring circuit 213 to use tripping circuit 214 to break the circuit. In some embodiments, measuring circuit 213 may include hardware components including logic components, a processor and software or firmware components to implement logic, or a combination. The logic may analyze the electrical values, such as current and voltage, of the input measuring circuit 213 and compare the electrical values to a threshold value. If the electrical values exceed the threshold value, measuring circuit 213 may transmit a signal to tripping circuit 214 to open switch 215, or otherwise trigger switch 215, to prevent current from flowing to load 220. However, if the electrical values do not exceed the threshold value, tripping circuit 214 may close switch 215 and allow current to flow to load 220. Measuring circuit 213 may also be configured to analyze the electrical values over a time period. In such cases, tripping circuit 214 can open switch 215 based on detecting an overload condition over the time period. In various examples, the threshold value is a pre-configured value determined based on load 220. In other examples, the threshold value may be set or changed during operations of circuit breaker 210.

Tripping circuit 214 may be any circuitry used to trip the circuit, such as circuitry to open switch 215, to ensure the current from power source 205 does not continue to load 220. Switch 215 may be, for example an actuator that breaks the circuit or any other circuitry to break the circuit such that current does not flow to load 220. Tripping circuit 214 is depicted separately from measuring circuit 213 for ease of description, however tripping circuit 214 and measuring circuit 213 may be a single circuit in some embodiments.

Load 220 is representative of a device or system in an industrial automation environment configured to receive and operate using AC power from a power supply, such as power source 205. In some instances, load 220 includes a device, such as a motor or a non-motor, that functions using three-phase AC power. In other instances, load 220 includes three non-motors, each of which can function using single-phase AC power. Examples of load 220 may include an industrial automation motor, an industrial automation drive, and a heating and ventilation system, among other devices.

In use, the primary winding of current sense transformer 212 receives power from power source 205. When the wire of the primary winding receives the power, the primary winding converts the electrical energy from power source 205 into magnetic energy. The magnetic energy flows through the core to the secondary winding. The secondary winding can convert the magnetic energy into electrical energy at a stepped-down, proportional current based on the turns ratio of the primary winding turns to the secondary winding turns. The primary winding turns may be an effective number of primary winding turns including a first number of primary winding turns in a first direction and a second number of primary winding turns in an opposite direction. The output from the secondary winding can be provided to measuring circuit 213, and the output from the primary winding can be provided to tripping circuit 214. Measuring circuit 213 can communicate to tripping circuit 214 when an overload or short circuit event occurs. When an overload condition occurs, tripping circuit 214 breaks the circuit, for example by opening switch 215, and stopping current flow to load 220.

It may be appreciated that circuit breaker 210 may also include more current sense transformers in addition to current sense transformer 212. In an example, one or more other current sense transformers may also be configured the same as current sense transformer 105 as described with respect to FIG. 1. In some embodiments, current sense transformer 212 may be coupled to measuring circuit 213 and tripping circuit 214 to measure short circuit overload conditions and the second current sense transformer may be coupled to separate measuring and tripping circuitry that measure overload conditions over time.

Figure 3:
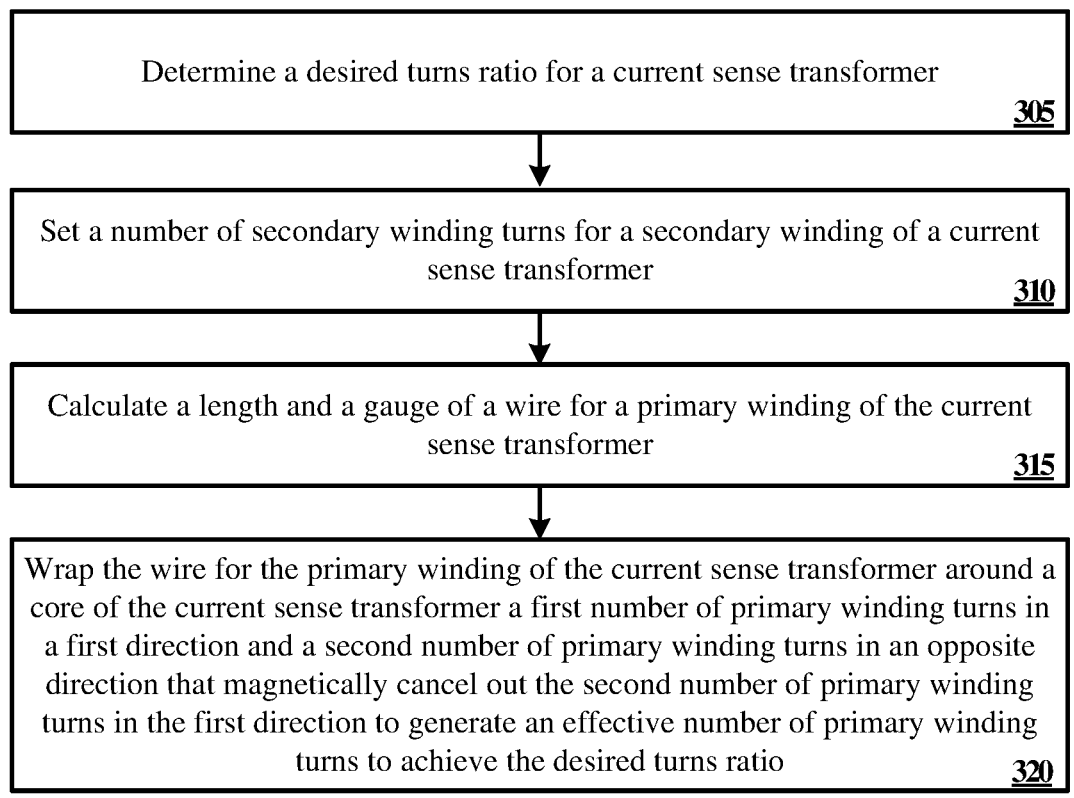
FIG. 3 illustrates a series of steps for configuring a circuit breaker device in accordance with some embodiments of the present technology.

FIG. 3 illustrates a series of steps for configuring a circuit breaker device in accordance with some embodiments of the present technology. FIG. 3 includes process 300, each operation noted parenthetically in the discussion below and which reference elements of FIG. 1. It may be appreciated that process 300 can be implemented in software, firmware, hardware, or any combination. Further, process 300 can result in the creation of a circuit breaker device such as circuit breaker 210 as described with respect to FIG. 2 and that includes a current sense transformer, such as current sense transformer 105 as described with respect to FIG. 1.

In operation 305, a desired turns ratio for a current sense transformer of a circuit breaker is determined. The circuit breaker may be circuit breaker 210, and the current sense transformer may be current sense transformer 105. The circuit breaker may be a protection device that can be used in industrial automation environments to protect loads coupled to the circuit breaker against short-circuiting and current overloads.

In operation 310, a number of secondary winding turns for the secondary winding of the current sense transformer is set. For example, secondary winding 117 using wire 111 wrapped around magnetic core 118 a number of secondary winding turns is determined. The secondary winding turns may be set based on manufacturing considerations, wire length and gauge considerations, thermal considerations, and the like.

In operation 315, a length and a gauge (i.e., thickness) of a wire for the primary winding of the current sense transformer is calculated. The length and gauge of the wire for the primary winding may be based on thermal considerations, impedance considerations, and any other electrical properties that may impact the functionality of the circuit breaker. Further, the circuit breaker may be subject to standards created by standards bodies that limit the amount of short circuit let-through current, thermal thresholds, and the like. Both the length and the gauge of the wire can impact the impedance and thermal behavior of the circuit breaker and the current sense transformer. Further, the length and gauge of the wire may impact the physical footprint of the circuit breaker and the current sense transformer because thicker, longer wire takes up more space than thinner, shorter wire, for example. Thus, the length and the gauge of the wire can be selected on various design and performance factors for operating the circuit breaker in an industrial automation environment. For example, in some cases, the length and gauge of the wire may be selected such that the impedance of the wire limits let-through energy when a short circuit occurs but does not create thermal dissipation issues (i.e., the thermal dissipation remains below a threshold temperature). The wire for the primary winding may be wire 112 as described with respect to FIG. 1.

In operation 320, the wire for the primary winding is wrapped around the core a first number of primary winding turns in a first direction and a second number of primary winding turns in the opposite direction that magnetically cancel out the second number of primary winding turns in the first direction to generate an effective number of primary winding turns to achieve the desired turns ratio. For example, wire 112 of primary winding 113 of the current sense transformer is wrapped around magnetic core 118 of the current sense transformer 105 a first number of primary winding turns 114-1, 114-2, 114-3 (i.e., three turns) in a first direction and a second number of primary winding turns 115-1 (i.e., one turn) in the opposite direction that magnetically cancel out the second number of primary winding turns 115-1 (i.e., one turn) in the first direction to generate an effective number of primary winding turns (i.e., two turns) to achieve the desired turns ratio. While two effective primary winding turns is used in this example, any number of primary winding turns may be used to generate any effective number of primary winding turns. The number of turns in each direction may be based on the length of the wire (e.g., wire 112). For example, if the effective number of primary winding turns needed is 10 to achieve the desired turns ratio, and there is a very long length of wire, the first number of primary winding turns in the first direction may be 30 and the second number of primary winding turns in the opposite direction may be 20 to result in an effective 10 primary winding turns. Advantageously, a current sense transformer, such as one described herein, can utilize various lengths and gauges of wires despite space constraints by employing process 300 to use excess wire while still meeting impedance and thermal density requirements of the circuit breaker device.

While some examples provided herein are described in the context of a circuit breaker, it should be understood that the current sense transformer systems and methods described herein are not limited to circuit breaker embodiments and may apply to a variety of other devices in which a current sense transformer may be used and their associated systems. As will be appreciated by one skilled in the art, aspects of the present invention may be embodied as a system or method and may include a computer program product, and other configurable systems. Accordingly, aspects of the present invention may take the form of an entirely hardware embodiment or an embodiment combining software (including firmware, resident software, microcode, etc.) and hardware aspects that may all generally be referred to herein as a "circuit," "module" or "system." Furthermore, aspects of the present invention may take the form of a computer program product embodied in one or more computer readable medium(s) having computer readable program code embodied thereon.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The phrases "in some embodiments," "according to some embodiments," "in the embodiments shown," "in other embodiments," and the like generally mean the particular feature, structure, or characteristic following the phrase is included in at least one implementation of the present technology, and may be included in more than one implementation. In addition, such phrases do not necessarily refer to the same embodiments or different embodiments.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for" but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A circuit breaker device, comprising:
   a power input; and
   a current sense transformer, comprising:
      a core,
      a secondary winding comprising a first wire wrapped around the core a number of secondary winding turns, and
      a primary winding coupled to the power input, the primary winding comprising a second wire wrapped around the core a number of primary winding turns, wherein the number of primary winding turns comprises a first number of primary winding turns in a first direction and a second number of primary winding turns in an opposite direction that magnetically cancel out the second number of primary winding turns in the first direction to generate an effective number of primary winding turns, wherein the effective number of primary winding turns and the number of secondary winding turns comprise a desired turns ratio, and wherein a length and a gauge of the second wire have an impedance to limit let-through energy during a short circuit event below a threshold.

2. The circuit breaker device of claim 1, wherein the gauge of the second wire is based on one or more dimensions of the circuit breaker device.

3. The circuit breaker device of claim 1, wherein a gauge of the second wire distributes thermal dissipation over a length of the second wire to limit a temperature of the circuit breaker device below a threshold temperature.

4. The circuit breaker device of claim 1, further comprising:
   a tripping circuit coupled to the secondary winding that trips the circuit breaker device based on sensing an overload condition over time.

5. The circuit breaker device of claim 1, further comprising:
   an actuator circuit coupled to the secondary winding, the actuator circuit comprising an actuator that trips the circuit breaker device based on sensing a current spike that exceeds a threshold.

6. The circuit breaker device of claim 1, further comprising:
   a second current sense transformer.

7. The circuit breaker device of claim 6, wherein the second current sense transformer comprises:
   a second core,
   a second secondary winding comprising a third wire wrapped around the second core a second number of secondary winding turns, and
   a second primary winding coupled to the power input, the second primary winding comprising a fourth wire wrapped around the second core a third number of primary winding turns, wherein the third number of primary winding turns comprises a fourth number of primary winding turns in a second direction and a fifth number of primary winding turns in an opposite direction relative to the second direction that magnetically cancel out the fifth number of primary winding turns in the second direction to generate a second effective number of primary winding turns, wherein the second effective number of primary winding turns and the second number of secondary winding turns comprise a second desired turns ratio.

8. A system, comprising:
a power source;
a circuit breaker device, comprising:
  a power input coupled to the power source,
  a current sense transformer, comprising:
    a core;
    a secondary winding comprising a first wire wrapped around the core a number of secondary winding turns; and
    a primary winding coupled to the power input, the primary winding comprising a second wire wrapped around the core a number of primary winding turns, wherein the number of primary winding turns comprises a first number of primary winding turns in a first direction and a second number of primary winding turns in an opposite direction that magnetically cancel out the second number of primary winding turns in the first direction to generate an effective number of primary winding turns, wherein the effective number of primary winding turns and the number of secondary winding turns comprise a desired turns ratio, and
    an output;
  an actuator circuit coupled to the secondary winding, the actuator circuit comprising an actuator that trips the circuit breaker device based on sensing a current spike that exceeds a threshold; and
  a load coupled to the output of the circuit breaker device.

9. The system of claim 8, wherein the load comprises an industrial automation motor.

10. The system of claim 8, wherein the load comprises an industrial automation drive.

11. The system of claim 8, wherein the load comprises a heating and ventilation system.

12. The system of claim 8, wherein a length and a gauge of the second wire have an impedance to limit let-through energy during a short circuit event below a threshold.

13. The system of claim 8, wherein a gauge of the second wire distributes thermal dissipation over a length of the second wire to limit a temperature of the circuit breaker device below a threshold temperature.

14. The system of claim 8, wherein the circuit breaker device further comprises:
  a tripping circuit coupled to the secondary winding that trips the circuit breaker device based on sensing an overload condition over time.

15. The system of claim 8, wherein the length and the gauge of the second wire is based on one or more dimensions of the circuit breaker device.

16. The system of claim 8, wherein the circuit breaker device further comprises:
  a second current sense transformer.

17. The system of claim 16, wherein the second current sense transformer comprises:
  a second core,
  a second secondary winding comprising a third wire wrapped around the second core a second number of secondary winding turns, and
  a second primary winding coupled to the power input, the second primary winding comprising a fourth wire wrapped around the second core a third number of primary winding turns, wherein the third number of primary winding turns comprises a fourth number of primary winding turns in a second direction and a fifth number of primary winding turns in an opposite direction relative to the second direction that magnetically cancel out the fifth number of primary winding turns in the second direction to generate a second effective number of primary winding turns, wherein the second effective number of primary winding turns and the second number of secondary winding turns comprise a second desired turns ratio.

18. A method of configuring a circuit breaker device, comprising:
  determining a desired turns ratio for a current sense transformer;
  setting a number of secondary winding turns for a secondary winding of the current sense transformer;
  calculating a length and a gauge of a wire for a primary winding of the current sense transformer, wherein calculating the length and gauge of the wire comprises calculating the length and the gauge so that a thermal dissipation of the wire is distributed over the length of the wire to limit a temperature of the circuit breaker device below a threshold temperature; and
  wrapping the wire for the primary winding of the current sense transformer around a core of the current sense transformer a first number of primary winding turns in a first direction and a second number of primary winding turns in an opposite direction that magnetically cancel out the second number of primary winding turns in the first direction to generate an effective number of primary winding turns, wherein the effective number of primary winding turns and the number of secondary winding turns comprise the desired turns ratio.

19. The method of claim 18, wherein the calculating the length and the gauge of the wire for the primary winding comprises calculating the length and the gauge of the wire so that:
  an impedance of the wire limits let-through energy during a short circuit event below a threshold energy.

20. The method of claim 19, wherein the threshold energy is set by a standards body.

* * * * *